United States Patent [19]
Guerra, Jr.

[11] Patent Number: 5,824,730
[45] Date of Patent: Oct. 20, 1998

[54] FAST PROCESSING WATER BASED BINDER SYSTEM

[75] Inventor: Manuel Guerra, Jr., Whitesboro, N.Y.

[73] Assignee: Remet Corporation, Utica, N.Y.

[21] Appl. No.: 105,921

[22] Filed: Aug. 13, 1993

[51] Int. Cl.[6] ............................. C08K 3/34; C08K 13/02; C08L 9/08; B32B 18/00
[52] U.S. Cl. ........................ 524/493; 524/492; 524/430; 524/847; 524/789; 523/216; 264/216
[58] Field of Search ................... 524/493, 492, 524/430, 847, 789; 523/216; 264/216

[56] References Cited

U.S. PATENT DOCUMENTS

| | | | |
|---|---|---|---|
| 3,005,244 | 10/1961 | Erdle et al. | 524/440 |
| 3,011,986 | 12/1961 | Operhall et al. | 524/401 |
| 3,013,897 | 12/1961 | Cupery et al. | 524/493 |
| 3,069,375 | 12/1962 | Bullitt et al. | 524/493 |
| 3,126,597 | 3/1964 | Operhall et al. | 164/517 |
| 3,165,799 | 1/1965 | Watts | 164/71 |
| 3,249,463 | 5/1966 | Carlee | 524/493 |
| 3,668,168 | 6/1972 | Self | 524/444 |
| 3,727,666 | 4/1973 | Vander Sluis | 427/135 |
| 3,752,680 | 8/1973 | Moore, Jr. | 427/133 |
| 3,752,689 | 8/1973 | Moore, Jr. | 427/133 |
| 3,773,776 | 11/1973 | Iler | 524/493 |
| 3,813,363 | 5/1974 | Schmidt et al. | 524/493 |
| 3,859,153 | 1/1975 | Beyer et al. | 428/428 |
| 3,894,572 | 7/1975 | Moore, Jr. | 164/516 |
| 3,933,190 | 1/1976 | Fassler et al. | 164/519 |
| 3,988,282 | 10/1976 | Beers | 523/200 |
| 4,094,685 | 6/1978 | Lester et al. | 260/2.5 B |
| 4,097,405 | 6/1978 | Watts | 524/493 |
| 4,196,107 | 4/1980 | Jones et al. | 260/17 R |
| 4,533,394 | 8/1985 | Watts | 106/38.2 |
| 4,740,246 | 4/1988 | Feagin | 106/38.22 |
| 4,787,439 | 11/1988 | Feagin | 164/518 |
| 4,996,084 | 2/1991 | Elkachouty | 427/133 |
| 5,004,039 | 4/1991 | Feagin | 164/361 |
| 5,118,727 | 6/1992 | Roberts et al. | 524/493 |
| 5,130,184 | 7/1992 | Ellis | 428/245 |
| 5,270,103 | 12/1993 | Oliver et al. | 428/219 |
| 5,275,846 | 1/1994 | Imai et al. | 427/362 |
| 5,391,341 | 2/1995 | Ballewski et al. | 264/113 |

FOREIGN PATENT DOCUMENTS

| | | | |
|---|---|---|---|
| 41 16 609 | 7/1992 | Germany . | |
| 0226060 | 12/1984 | Japan | 524/493 |

OTHER PUBLICATIONS

Roberts, "A New Approach To Stable Slurries," from the 40th Annual Technical Meeting: Investment Casting Institute, 1992.

DuPont Technical Information Brochure on Ludox SK (undated, no author).

*Primary Examiner*—Vasu Jagannathan
*Assistant Examiner*—Olga Asinovsky
*Attorney, Agent, or Firm*—Beveridge, DeGrandi, Weilacher & Young, LLP

[57] ABSTRACT

The invention relates to a water based binder for use in a slurry for investment casting. The binder includes a mixture of a colloidal silica sol and at least one latex polymer. The latex polymer is preferably an acrylic latex or a styrene butadiene polymer (or a combination of these) which reduces the processing time between dips during shell mold making for investment casting. The latex polymer further lowers a critical concentration point or gelation point of the colloidal silica sol. The binder may be used as a primary binder or a backup binder in the shell mold making process. To make the slurry, the binder is combined with at least one refractory powder, preferably a refractory powder selected from the group of: alumino-silicates, fused silica, quartz silica, alumina, zircon, and zirconia.

6 Claims, No Drawings

FAST PROCESSING WATER BASED BINDER SYSTEM

FIELD OF THE INVENTION

This invention relates to the use of a water based binder system comprising colloidal silica and polymer(s) to create a rapid-processing slurry system. This binder, when used to make a slurry, is capable of building a ceramic shell in a very short time, for use in an investment casting process.

DESCRIPTION OF THE PRIOR ART

The following documents relate to the technological background of this invention:

(A) U.S. patents:

| | | |
|---|---|---|
| 3,005,244 | 10/1961 | Erdle, et al. |
| 3,126,597 | 3/1964 | Operhall, et al. |
| 3,165,799 | 1/1965 | Watts |
| 3,752,689 | 8/1973 | Moore |
| 3,859,153 | 1/1975 | Beyer, et al. |
| 3,894,572 | 7/1975 | Moore |
| 3,933,190 | 1/1976 | Fassler |
| 4,996,084 | 2/1991 | Elkachouty |
| 5,118,727 | 6/1992 | Roberts |

(B) Foreign Patent Publications:

| | | |
|---|---|---|
| DE 41 16 609 A1 | Germany | 7/1992 |

(C) Other Publications:

The E.I. DuPont de Nemours & Co., Ludox® Colloidal Silica handbook on DuPont Ludox® colloidal silica products.

Encyclopedia of Chemistry, 4th edition, edited by Douglas Considine, Van Nostand Reinhold, New York, N.Y., 1984.

The documents cited above are all entirely incorporated into this application by reference.

The investment casting process (also known as the lost wax process) is thousands of years old. Until very recently (circa 1950), flask molding was the predominant technique for making investment castings. Although flask molding is still used for jewelry and dental castings, the technique of producing a shell-mold significantly opened up the field for commercial and aerospace investment castings, because a much greater variety of part configurations and sizes could be cast.

Producing a shell-mold for investment casting usually includes dipping a wax replica (or model) into a slurry containing a binder and a refractory powder. The slurry coats the wax, and excess slurry is allowed to drain off. A coarser refractory is sprinkled onto the wet wax pattern, and this combination is allowed to dry. Additional coatings of slurry and refractory are applied by the same method until the mold has sufficient thickness and strength for further processing. The first coat applied is usually of a finer mesh size so that the mold will include fine detail and a good surface finish. Backup coats are usually made of coarser powders. After it is thoroughly dry, the shell-mold is then "dewaxed" to remove the original wax pattern. Then, the shell-mold is fired to remove residual organics and to attain fired strength. Molten metal is then poured into the shell-mold. After the metal is cooled, the shell is broken away and a metal casting has been produced.

There are two main binder types used in shell making. The first is ethyl silicate, which is a solvent based system usually employing ethanol, or a combination of ethanol and isopropanol.

This first type of binder is very versatile in that it can be used in conjunction with either air drying techniques, or techniques which include adding a gelling agent for a more rapid set. However, the alcohol in this binder is considered a volatile organic compound (VOC), and its use has been tightly regulated. Additionally, it is even restricted from use in many areas.

The second type of binder is colloidal silica, which is a water-based dispersion of minute silica particles. Since this binder has no VOC problems, it continually displaces ethyl silicate in many production foundries. However, those foundries accustomed to the rapid processing speed that ethyl silicate provides, often find it difficult to work with regular colloidal silica. In addition, other foundries already using colloidal silica need to shorten the time it takes to produce a final casting because of pressure from competing technologies which have a shorter turn-around production cycle.

The biggest drawback to using colloidal silica is that since it is water-based, long drying times are usually necessary to properly set the bonds. Whereas ethyl silicate can be gelled by a strong base and still produce a hard durable coating, when colloidal silica is gelled, it usually produces very weak bonds. With very few exceptions, shells made with colloidal silica for investment casting are air dried.

Because of its relatively lower vapor pressure as compared to alcohol, water evaporates much more slowly. Thus, a typical air dried colloidal silica shell coat will take much longer to dry (or set) than one made with ethyl silicate under identical drying conditions. In addition, since the ethyl silicate system can be effectively gelled by means of ammonia gas after one to one and one half hours after the previous dip, it can then be redipped almost immediately. Typical colloidal silica needs to be air dried (or other processing methods, such as vacuum drying) from 3–8 hours to achieve the same level of bonding, depending upon the casted part configuration. This drying time can be upwards of 24 hours or more between coats if the part has deep pockets, recessed areas, or other difficult to dry configurations.

Although many different techniques have been tried to speed up the shell making process, the results have not been very successful. U.S. Pat. No. 3,126,597 describes the addition of sodium fluoride (NaF) to try to increase the setting rate of colloidal silica. This approach has been relatively unsuccessful because the colloidal silica binder tends to become destabilized, and can gel prematurely before it is used.

In U.S. Pat. No. 3,752,689, Moore describes a method for producing shells by using a positively charged sol with an organic or inorganic base to gel the system. As mentioned earlier, gelled systems tend to produce weak bonding, and thus low strength.

U.S. Pat. No. 3,859,153 describes a fast processing method in which a negatively charged colloidal slurry is applied, then a positively charged colloidal slurry, then a slurry consisting of a refractory powder and a solution of an alkaline ionic silicate (such as sodium or potassium silicate), and then repeating the positive sol dip and the ionic silicate until a shell-mold of sufficient thickness is built. Stuccoing the layers was optional. The shells produced by this method were said to have good strength, but the need for several slurry systems with a rigorous dipping sequence are disadvantages of this system. Furthermore, the shell-molds are very heavy, breakage prone (during the dipping process; strength was developed during drying), and there is a potential for cross-contamination between those systems.

These are additional disadvantages of this system. Thus, this method never really developed.

In U.S. Pat. No. 3,894,572, Moore describes a process for rapidly making shells by first dipping into a slurry with a positively charged colloidal silica, then stuccoing the wetted mold with a refractory material containing a chemical setting agent. This process then was repeated (after a 1–5 minute setting time) until a sufficient thickness was built up. As mentioned above, this process would also suffer from the same type of problems usually found with rapid gelling of colloidal silica, i.e., heavy shells during processing and low strength.

It is known to add certain organics to impart strength or elasticity, or even tackiness to the shell or slurry coat. These organic materials have included PVA (polyvinyl alcohol) and latexes (colloids of natural or synthetic rubbers or plastic suspended in water). The above mentioned materials were added mainly for strength development, as mentioned by Erdle, et al. in U.S. Pat. No. 3,005,244. This patent describes that polymers (latexes belong to this group) were added to colloidal silica to produce high-strength expendable patterns, and high-strength expendable patterns requiring no additional backup (i.e., mold patterns that stood alone, not needing to be placed in a flask and backed up with additional refractory).

As mentioned above, the addition of latexes has been to basically add green strength (and also flexibility) to the shell-mold, or to improve tackiness when used in a primary slurry. In U.S. Pat. No. 4,996,084, Elkachouty mentions using a "latex glue" in the preferred backup slurry. While he does not mention what the "latex glue" does, one skilled in this art would recognize that its intended function is to add additional green strength for a "high strength backup coat." In actual foundry practice, latexes are commonly added to primary slurries, but are not usually added to backup slurries.

In U.S. Pat. No. 5,118,727, Roberts describes a system including a metal modified, deionized colloidal silica which also contains a water soluble polymer, such as PVA. This patent describes a binder system that yields a very stable, long-life slurry system. This system employs a polymer (PVA), but this polymer is of a completely different type than that contained in the binder system in accordance with the invention. Roberts also does not mention fast processing capability.

German Patent Appl. No. DE 41 16 609 A1 describes the use of a quick-drying backup binder system employing a synthetic high polymer (or polymers) and an emulsion from the group of organo-silicon compounds. The idea presented in this German patent application is to build a waterproof barrier with the above mentioned materials in the dried slurry layer, wherein the barrier is still steam-permeable. This would inhibit rewetting of the entire mold during the next dipping sequence by allowing only the last dried layer to become wetted. This allows the mold to dry faster since essentially only the outside of the mold has become saturated. The technique of setting up a water-resistant barrier on each dip sequence is different from the system in accordance with the invention. This invention is based on rapidly setting the colloidal silica portion of the binder through the addition of a latex polymer or polymers.

One other method of producing a shell-mold in a short time period includes changing the environmental conditions, such as lowering room relative humidity to low levels (<30% RH), applying large volumes of air (>400–500 fpm air movement), or applying small amounts of heat to help drive off moisture. These methods can be (and are) used, but these methods are process oriented, while the instant invention is material oriented. The system in accordance with the invention can be used under widely varying environmental conditions; however, further improvements and better results will be obtained through the use of environmental controls.

SUMMARY OF THE INVENTION

This invention relates to a mixture of colloidal silica and at least one latex polymer that significantly shortens the time necessary to produce a ceramic shell. As stated previously, polymers have been added primarily for strength development. In the composition according to the invention, latex polymer(s) are added to colloidal silica for the purpose of lowering the gel point of the colloidal silica used, although the exact mechanism is not known, and applicant does not wish to be bound by any particular theory of operation. It is also believed that the latex "ties up" or binds the colloidal particles during the drying in a way that helps prevent washing out of the silica bonds during subsequent dipping, although, again, applicant does not wish to be bound by any particular theory of operation.

Any particular type of colloidal silica will have a level of silica concentration that, when reached, will cause the individual colloidal silica particles to clump together, or gel. The particles are then permanently bonded together. The phenomenon of gelation by drying is described in the DuPont Ludox® Colloidal Silica booklet as follows: "During drying, the hydroxyl groups on the surface of the particles condense by splitting out water to form siloxane bonds (Si—O—Si) resulting in coalescence and interbonding." Drying is by far the most preferred method of gelling colloidal silica in investment casting.

Three colloidal silica based products that are used in this invention are based on Remasol® SP-30, Remasol® LP-30, and DuPont Ludox® FM. The commonly used corresponding binders that are part of this invention are known as Remasol® ADBOND® SP-BV, Remasol® ADBOND® LP-BV, and Remasol® ADBOND® VSP-BV. The Remasol® SP-30 is supplied by DuPont (Dupont Ludox® SM), and it is a 30% silica (by weight), sodium hydroxide stabilized sol with an average particle diameter of 7–9 nanometers (nm). The Remasol® LP-30 is also supplied by DuPont (Dupont Ludox® HS-30), and it is a 30% silica, sodium hydroxide stabilized sol with an average particle diameter of 11–14 nm. The last grade, Dupont Ludox® FM, is a 15% silica, sodium hydroxide stabilized sol, and has an average particle size of 4–5 nm.

The three types of sols mentioned above are the most commonly used sizes in the investment casting industry, and such sols are well known to those skilled in the art. Other colloidal silica grades which have different silica concentrations, particle sizes, and/or particle size distributions can also be used.

The above three colloidal silicas make an excellent base for the latex polymer(s). To help insure compatibility, a stabilizer, such as nonylphenol ethoxalate or a dimethicone silyiate may be added. Typically, about 0.01 to 0.25%, and preferably about 0.02 to 0.1% (based on the total liquid content) of either of these additives may be included to enhance the compatibility and stability of the mixed product. Dimethicone silyiate is preferred.

One unique aspect of this invention relates to the latex polymer package that is added to the colloidal binder. The latex package can be one or more polymers. The latex polymer is added to the colloidal silica base in any proportion such that the ratio of silica to latex polymer(s) is greater than 1:1, and preferably greater than 4:1. The concentration of silica would be expected to be between 8% and 50% by weight: of the composition. A preferred ratio would be 11.5 parts colloidal silica to 1 part latex polymer(s), but a ratio of 24:1 to 7:1 colloid : latex is an acceptable range. It is preferred that the latex polymer be present in an amount of 2 to 20% by weight, based on the binder weight. One skilled in the art, would appreciate that additional water may be added to the colloidal binder to reduce the silica concentration. This would become part of the colloidal binder and the percent latex polymer would remain the same. The higher the starting silica concentration, the faster the binder will set. Other ingredients (dyes, plasticizers, etc.), well known to those skilled in the art, can also be added to the binder without altering the spirit and scope of this invention.

The binder invention mentioned above, when used to produce a shell-mold for the investment casting process, not only provides for decreased processing times between shell dips, but also provides for better handling and dewaxing through increased green strength. In addition, the removal of the shell from the metal casting (after metal pouring and cooling of the casting) is made easier by a reduction in the fired strength of the shell.

DETAILED DESCRIPTION OF THE INVENTION

The composition of the invention comprises a colloidal silica sol and latex polymer(s), which, when mixed together, create an enhanced colloidal binder system. The colloidal silica sols which can be used in this invention have average particle sizes of 3 to 100 nanometers (nm), preferably 5–20 nm, and have a silica content of 8–50% (by weight), and preferably 12–30%.

There are many types of latexes, such as vinyl acetates, polyvinyliden chlorides, acrylics, styrene butadienes, etc. The styrene butadiene latexes have received the most attention in investment casting, as many of these possess good compatibility when mixed with colloidal silica, and can add to improved shell green strength.

It should be noted that while good compatibility with the colloidal is a very important parameter of any latex additive, it is not necessary that the latex remain suspended in the colloidal before the material is mixed with refractory powder and a slurry is produced. The meaning here is that the latex polymer can be added to the colloidal at the time of slurry mixing; after mixing of the colloidal and powder, but before dipping is started; or it can be mixed with the colloidal well in advance of adding the powder. The timing of the introduction of the latex polymer is unimportant, as long as it is done before dipping is started.

This invention relates to a binder including at least one acrylic type latex polymer combined with a colloidal silica base. Alternatively, it will be shown that other latex polymer types, such as styrene butadiene, can be used to yield a similar binder system, although with somewhat different properties.

While the invention can include the use of styrene butadiene or acrylic type latex polymers, the preferred embodiment is a latex polymer including a blend of acrylic polymers with the following properties: a pH in the range of 6–11 (most preferably 7–10); a viscosity in the range of 50–1000 centipoise (most preferably 50–500); a solids content of 40–65% (most preferably 45–55%); and an average particle size of 0.05–1.0 microns (most preferably 0.1–0.5 microns).

The binder in accordance with invention can be used to produce a slurry with the addition of one or more compatible refractory powders. Examples of powders commonly used in the investment casting industry are zircon ($ZrSiO_4$), silica ($SiO_2$), both fused and quartz; alumina ($Al_2O_3$), zirconia ($ZrO_2$), and alumino-silicate (various combinations of $Al_2O_3$ and $SiO_2$, usually fired to high temperatures, >2500° F.). Any other compatible powder system can also be used. The sizes of the powders used are typically classified as −120 mesh (U.S.A. Standard Sieves) to −400 mesh. The sizes normally used are well known to those skilled in the art, and other sizes are not excluded from the scope of this invention. The slurry preferably will have a viscosity in the range of 5 to 50 seconds, as measured by a #4 Zahn cup.

The following is a listing of many of the items and terms used in this specification:

Colloidal Silica—An aqueous dispersion of minute silica particles, usually employing a small amount of a strong base (e.g., ammonia or sodium hydroxide) as a stabilizer to yield a stable suspension. The resulting pH is typically in the 8.0–11.0 range.

Polymer—A macromolecule formed by the chemical union of 5 or more identical combining units called monomers. The polymer types described in this invention are known as elastomers. An elastomer is a polymer possessing elastic properties.

Refractory—A material that is resistant to change, especially to the application of heat. The main refractories used in the industry are as follows:

Zircon: $ZrSiO_4$ (Zirconium Silicate)
Alumina: $Al_2O_3$ (Aluminum oxide)
Silica: $SiO_2$ (Silicon Dioxide)
Alumino-silicate: $xAl_2O_3 \bullet ySiO_2$ Blends of alumina and silica that have usually been fired to high temperature (>2500° F.) to form a stable phase known as mullite, and to minimize shrinkage due to firing. Two of the most commonly used grades are Remasil® 48 and Remasil® 60, which contain 48 and 60% (respectively) alumina, with the remainder mostly silica and traces of impurities. These alumino-silicates are produced by C.E. Minerals for Remet Corporation.

The refractories mentioned above are in two forms. One form is the form of a powder, and the other form is the form of a coarser sand, usually called stucco. Both the powders and stuccos can vary in their sizes, according to the respective application.

Latex Polymer—An elastomeric polymer. The main ones of interest being from the styrene butadiene (S/B type) group and the acrylic group. Below is a listing of the polymers listed in this application and used in accordance with the invention, and their typical properties:

| LATEX # | pH | % SOLIDS | VISCOSITY (centipoise) | SPECIFIC GRAVITY (g/ml) | LATEX TYPE |
|---|---|---|---|---|---|
| 100 | 8–9 | 53% | N/A | 1.01 | S/B |
| 101 | 6–7 | 50% | N/A | 1.01 | S/B |
| 120 | 8.5 | 50% | 200 | 1.03 | Acrylic |
| 121 | 7.0 | 50% | 40 | 1.01 | Acrylic |
| 140 | 9.5 | 47% | 100 | 1.05 | Acrylic |

In general, the binder in accordance with the invention may be used to make a shell-mold according to the following process. The binder including a mixture of a colloidal sol and at least one latex polymer is made, wherein the latex polymer or polymers present in the binder reduces the processing time between dips during the shell mold making process. A refractory powder is added to the binder to make a slurry, and the slurry is mixed to wet-out the powder. A disposable pattern such as a wax pattern is dipped into the slurry, the excess slurry is drained off, and the pattern is stuccoed with an additional refractory while it is still wet. The pattern and slurry are dried to set bonds in the binder.

The dipping, draining, and stuccoing steps may be repeated as necessary to build up a shell mold having a predetermined, desired thickness. After the mold is completed, the disposable pattern is eliminated by heating, and the shell mold is fired. After firing, molten metal is poured into the shell mold and allowed to cool. After cooling, the shell mold is broken off from the metal to provide a desired casted metal component.

The following Examples described preferred embodiments of the claimed invention. These Examples should be construed as illustrating the claimed invention, and not as limiting the same.

EXAMPLE #1

A test involving the binder in accordance with the invention is as follows:

Three backup slurries were made according to the following formulas:

| Binder #1 (REMASOL ® ADBOND ® SP-BV) | |
|---|---|
| Remasol ® ADBOND ® SP-BV binder-(Remasol ® SP-30 with stabilizer) | 3939 grams |
| Deionized (DI) Water | 241 grams |
| Remet polymer #120 (acrylic type) | 181 grams |
| Remet polymer #140 (acrylic type) | 181 grams |
| | 4542 grams |
| % $SiO_2$ concentration = 26% | |
| % Latex polymer = 8% | |
| Binder #2 (REMASOL ® ADBOND ® LP-BV) | |
| Remasol ® ADBOND ® LP-BV binder-(Remasol ® LP-30 with stabilizer) | 4180 grams |
| Remet polymer #120 (acrylic type) | 181 grams |
| Remet polymer #140 (acrylic type) | 181 grams |
| | 4542 grams |
| % $SiO_2$ concentration = 27.6% | |
| % Latex polymer = 8% | |
| Binder #3 (Remasol ® SP-30 at 26% $SiO_2$ - Control - No polymer) | |
| Remasol ® SP-30 | 3921 grams |
| Deionized (DI) Water | 603 grams |
| | 4524 grams |
| % $SiO_2$ concentration = 26% | |
| % Latex polymer = 0% | |

Binders 1, 2 and 3 were then mixed with a 60% alumina, alumino-silicate powder (Remasil® 60 RP325, a product of Remet Corporation) in the following ratio:

2500 grams binder/3600 grams powder.

The slurries were mixed by rolling in plastic jars on a jar mill for 72 hours. The viscosity of each was checked, and adjusted with binder to 10–11 seconds, #4 Zahn cup. Room conditions were as follows: 51+/−2% (RH), 74°+/−2° F. (Temp.), and 30–260 fpm (air flow). The reason for the variable air flow was that oscillating fans were used. In industry, during the drying process, it is very rare that any shell-mold being dried would have high constant air movement. Oscillating fans more closely duplicate what happens in actual practice.

For this test, groups of test bars known as MOR (modulus of rupture) bars were used as outlined here: wax strips measuring 0.5 inch (thick)×1.0 inch (width)×8 inches (length) were dipped into each test slurry, drained of excess slurry, then stuccoed with Remasil® 60 RG30 stucco (an alumino-silicate stucco) to build up thickness. 60 RG30 stands for a 60% alumina content (by weight) having a 30 mesh size (U.S. standard sieves). This convention is used throughout the specification. Six coats were applied in this manner, the last coat had no stucco applied, This last coat is called a "seal" coat. The practice of dipping MOR bars is well known to those experienced in the art.

The test pieces were produced by the following method. Each group of test MOR bars were dipped in a very tightly controlled sequence at one hour, two hours, three hours, and four hours between dipping the test bar in the ceramic slurry. Normally, test bars are dipped every 3 or 4 hours. The reason for the additional times of 1 and 2 hours was to study the strength development versus time, especially at very short dip intervals. In practice, dipping of molds (or even test pieces) in colloidal silica based slurries in 1 or 2 hour time intervals without special drying equipment usually leads to defective molds or scrapped castings.

After dipping to the above mentioned time schedule, the test pieces are processed to obtain the MOR results. A final dry time of 24 hours is completed before any processing is done. The sides of the test bars are ground off so that the ceramic test piece can be removed from the wax strip. A knife or other sharp-edged object will usually suffice to pry off the ceramic. Half of the ceramic bars are usually processed green (i.e., no heat applied), and half are fired to 1800° F. for 1–2 hours then cooled. All the bars are then broken on a 3-point load tester. Once the load necessary to break a bar is determined, the following formula is used to determine the MOR (modulus of rupture):

MOR=3×span×load/2×width×thickness$^2$ wherein, span= span at break (3 inches in this case);

width=width of ceramic bar; and thickness=thickness of ceramic bar at actual break point. The resultant green and fired MOR are shown as follows:

| DRY TIME BETWEEN DIPS | REMASOL ® SP-30 at 26% SILICA Control | REMASOL ® ADBOND ® SP-BV at 26% SILICA | REMASOL ® ADBOND ® LP-BV at 27.6% SILICA |
|---|---|---|---|
| MOR (in psi) | | | |
| GREEN MOR: | | | |
| 1 Hour | 224 +/− 23 | 471 +/− 19 | 410 +/− 18 |
| 2 Hours | 317 +/− 16 | 449 +/− 12 | 477 +/− 31 |
| 3 Hours | 355 +/− 40 | 423 +/− 46 | 485 +/− 41 |
| 4 Hours | 394 +/− 33 | 468 +/− 56 | 519 +/− 35 |
| FIRED MOR at 1800° F. for 1 Hour: | | | |
| 1 Hour | 771 +/− 73 | 817 +/− 60 | 685 +/− 72 |
| 2 Hours | 974 +/− 74 | 882 +/− 44 | 973 +/− 25 |
| 3 Hours | 1155 +/− 142 | 881 +/− 63 | 972 +/− 119 |
| 4 Hours | 1117 +/− 176 | 821 +/− 85 | 997 +/− 49 |

The green MOR results show that the inventive binder system, whether based on large or small particle colloidal silica, develops high bond strength in only one hour, while the control took 3 hours to pass the 350 psi mark, and never even reached the strength levels of either Remasol® ADBOND® SP-BV or Remasol® ADBOND® LP-BV. (To those experienced in the art, 350 psi green strength is usually considered the minimum necessary for adequate dewaxing strength.)

The significance of the rapid attainment in green strength indicates that ceramic shell-molds made with Remasol® ADBOND® SP-BV or Remasol® ADBOND® LP-BV are setting much faster than with standard colloidal silica. This means that the time between dips could be significantly shortened by using the binder in accordance with the invention.

The green MOR strength progression when using standard colloidal silica starts out low, then continues to increase until it reaches its maximum strength. This follows the scenario of the drying of the ceramic test pieces. The colloidal bonds start out far away from each other, then as water leaves the system (through evaporation), more and more bonds join together. After sufficient drying time, enough bonding and water loss has occurred so that the piece has achieved a good level of green strength, and the next dipping cycle will not wash out the existing bonds. When the binder in accordance with invention is used, much less water needs to be lost before redipping the part can be completed successfully. This decreases the time necessary to dry the part.

The fired MOR results indicate that all three systems have similar fired strength after 1–2 hours of drying time. However, after 3 hours drying time, the Remasol® ADBOND® LP-BV was 16% weaker, while Remasol® ADBOND® SP-BV was 24% weaker versus the control. At 4 hours, Remasol® ADBOND® LP-BV was 11% weaker, and Remasol® ADBOND® SP-BV was 26% weaker. In most instances, it is advantageous to have a lower fired strength, since after pouring the metal, the shell is easier to remove from the metal casting.

EXAMPLE #2

Binders and slurries similar to Example #1 were prepared except that −120 mesh fused silica powder (from Tennessee Electro Minerals Corp., or TECO) was used in the backup slurries, and a slightly smaller stucco size was used (Remasil® 60 RG40—a 60% alumina, alumino-silicate material). In this test, fresh batches of binder #2 and #3 (from example #1) were prepared:

| Binder #4 (Remasol ® LP-30 at 28% SiO$_2$ - Control - No polymer) | |
|---|---|
| Remasol ®LP-30 | 4297 grams |
| Deionized (DI) Water | 307 grams |
| | 4604 grams |
| % SiO$_2$ concentration = 28% | |
| % Latex polymer = 0% | |

Slurry formulations for all 3 slurries were:

2400 grams binder/3456 grams fused silica flour. Room conditions were:

50–54% RH,

72°–76° F. for temperature,

30–250 fpm air flow.

All the slurries were mixed as before (3 days), and the viscosities all adjusted to 12–13 seconds, #4 Zahn cup, with small amounts of binder.

The same sequence of dipping and testing of the bars was followed as in Example #1. The green and fired MOR data obtained are shown as follows:

| DRY TIME BETWEEN DIPS | REMASOL ® SP-30 at 26% SILICA Control | REMASOL® LP-30 at 28% SILICA Control | REMASOL ® ADBOND ® LP-BV at 27.6% SILICA |
|---|---|---|---|
| MOR (in psi) | | | |
| GREEN MOR: | | | |
| 1 Hour | 116 +/− 9 | 137 +/− 14 | 341 +/− 24 |

-continued

MOR (in psi)

| DRY TIME BETWEEN DIPS | REMASOL® SP-30 at 26% SILICA Control | REMASOL® LP-30 at 28% SILICA Control | REMASOL® ADBOND® LP-BV at 27.6% SILICA |
|---|---|---|---|
| 2 Hours | 202 +/− 7 | 251 +/− 21 | 459 +/− 21 |
| 3 Hours | 280 +/− 22 | 334 +/− 21 | 471 +/− 35 |
| 4 Hours | 282 +/− 20 | 349 +/− 36 | 488 +/− 24 |
| FIRED MOR at 1800° F. for 1 Hour: | | | |
| 1 Hour | 197 +/− 10 | 257 +/− 32 | 280 +/− 12 |
| 2 Hours | 251 +/− 16 | 332 +/− 24 | 399 +/− 36 |
| 3 Hours | 300 +/− 19 | 441 +/− 51 | 421 +/− 41 |
| 4 Hours | 309 +/− 17 | 435 +/− 28 | 451 +/− 4 |

The same green MOR strength differences as was seen with the all alumino-silicate systems in Example #1 is seen here. The Remasol® ADBOND® LP-BV slurry system yielded more green MOR in one hour than the Remasol® SP-Control system did after 4 hours, and yielded equivalent MOR in one hour between dips to the Remasol® LP-Control system after 3 hours drying between dips. This large difference in green MOR at the shortest drying times again shows that the bars dipped into the binder slurry in accordance with the invention are capable of being processed at a much faster rate than standard colloidal silica.

With a fused silica backup system, the firing temperature is very important. When temperatures above 1650° F. are used, fused silica undergoes a slow phase transformation to cristobalite (a crystalline form of silica). The temperature used in this test, 1800° F., was enough to transform some portion of the fused silica to cristobalite. Therefore, when the ceramic test bars were cooled, a large volume change occurred during the cool-down. This causes large stress cracking to occur, which drastically lowers the strength after firing. This is one reason fused silica is widely used in the investment casting industry, i.e., the shell may be removed fairly easily after casting.

For this test, the large drop in strength due to the fused silica overshadows the relatively smaller differences caused by the binder. So, with this system (fused silica), the fired MOR's all were low, especially the Remasol® SP-Control. Most of the differences seen here are fairly minor, especially between the Remasol® LP-Control and the Remasol® ADBOND® LP-BV systems.

EXAMPLE #3

In this test, slurries similar to Examples #1 and #2 were prepared, except that Molochite −200 mesh flour (a 43% alumina, alumino-silicate product of ECC International, Ltd.) was used. Binders #1, #2, #3 and #4 were used, and the following ratio was followed:

2360 grams binder/4000 grams Molochite −200 mesh powder.

As before, the slurries were mixed on a jar mill for 72 hours, then the viscosities of each were adjusted with the appropriate binder. The room temperature was 72+/−2° F., RH was 50+/−3%, and air velocity used was 30–280 fpm. Molochite 16×30 mesh stucco (also a 43 % alumina material) was used as the backup stucco material.

The MOR results are as shown here:

| DRY TIMES BETWEEN DIPS | REMASOL® SP-30 at 26% SILICA Control | REMASOL® ADBOND® SP-BV at 26% SILICA | REMASOL® LP-30 at 28% SILICA Control | REMASOL® ADBOND® LP-BV at 27.6% SILICA |
|---|---|---|---|---|
| GREEN MOR: | | | | |
| 1 Hour | 238 +/− 16 | 574 +/− 49 | 246 +/− 75 | 529 +/− 75 |
| 2 Hours | 338 +/− 33 | 693 +/− 42 | 337 +/− 45 | 604 +/− 65 |
| 3 Hours | 468 +/− 18 | 692 +/− 29 | 486 +/− 32 | 668 +/− 39 |
| 4 Hours | 454 +/− 31 | 643 +/− 54 | 486 +/− 36 | 683 +/− 36 |
| FIRED MOR at 1800° F. for 1 Hour: | | | | |
| 1 Hour | 620 +/− 64 | 698 +/− 35 | 723 +/− 83 | 742 +/− 51 |
| 2 Hours | 917 +/− 37 | 1033 +/− 121 | 892 +/− 107 | 871 +/− 74 |
| 3 Hours | 1201 +/− 134 | 1052 +/− 60 | 1157 +/− 85 | 1003 +/− 70 |
| 4 Hours | 1315 +/− 47 | 1081 +/− 16 | 1231 +/− 51 | 949 +/− 123 |

As seen in the previous examples, the green MOR of the binder system in accordance with the invention easily out performs colloidal silica. Furthermore, as in Example #1, in a system with no major phase changes occurring, the inventive binder lowers the fired MOR strength after 3 or more hours drying between dips.

EXAMPLE #4

This example illustrates the effect of different ratios of the latex polymers. In the previous three examples, a 50/50 blend of polymers was used. In this test case, binder formula #2 (Remasol® ADBOND® LP-BV from Example #1) was used as the control. The other binders vary only in their ratio of polymer, as shown here:

Binder #5:

Same as binder #1, except: 25% Remet latex polymer #140/75% Remet latex polymer #120.

Binder #6:

Same as binder #1, except: 38% Remet latex polymer #140/62% Remet latex polymer #120.

Binder #7:

Same as binder #1, except: 62% Remet latex polymer #140/38% Remet latex polymer #120.

Binder #8:

Same as binder #1, except: 75% Remet latex polymer #140/25% Remet latex polymer #120.

As before, wax strips were used to make MOR test bars. Room conditions were: RH—47+/−3%; temperature—72°+/−3° F.; and air velocity was 20–250 fpm. The viscosity of each slurry was adjusted to 12 seconds, #4 Zahn cup, and dry time between dips were 1, 2 and 3 hours. The 4 hour dry time was dropped, as it was not believed to be necessary. Results up to 3 hours are more than satisfactory.

The flour and stucco used in this test were Remasil® 48 RP325 (a 48% alumina, alumino-silicate powder) and Remasil® 48 RG30 (a 48% alumina, 30 mesh grain, or stucco). These are products of Remet Corporation. The initial ratio of binder to powder was:

2500 grams binder/3600 grams Remasil® 48 RP325.

The dipping and testing was as previously done. The MOR results are as shown, the polymer ratio is used as the heading:

| DRY TIME BETWEEN DIPS | (Control) 50/50 | 25/75 | 38/62 | 62/38 | 75/25 |
|---|---|---|---|---|---|
| GREEN MOR | | | | | |
| 1 Hour | 628 ± 46 | 663 ± 53 | 622 ± 30 | 551 ± 23 | 547 ± 16 |
| 2 Hours | 734 ± 30 | 707 ± 25 | 677 ± 26 | 646 ± 60 | 641 ± 27 |
| 3 Hours | 718 ± 29 | 812 ± 44 | 738 ± 38 | 759 ± 50 | 666 ± 38 |
| FIRED MOR 1800° F. 1 HOUR | | | | | |
| 1 Hour | 797 ± 86 | 798 ± 49 | 776 ± 76 | 777 ± 87 | 812 ± 52 |
| 2 Hours | 850 ± 69 | 854 ± 74 | 944 ± 84 | 990 ± 90 | 885 ± 38 |
| 3 Hours | 964 ± 22 | 818 ± 48 | 920 ± 68 | 969 ± 21 | 812 ± 15 |

MOR RESULTS (in psi) (all binders at 26% Silica)

These results indicate that the ratio of the polymers does make some difference. The initial choice of a 50/50 blend was a good choice for both green and fired MOR properties. The 50/50 blend had the fastest green MOR progression at 2 hour dry time between dips. A dry time of 2 hours is usually considered the absolute minimum in actual practice, although as stated previously, a time between dips of 3–4 hours, to about 8–10 hours is considered normal to those experienced in the art. The 25/75 blend had the highest green MOR at 3 hours dry.

In addition, the 25/75 system exhibited a lower level of fired strength versus the 50/50 control at 2 and 3 hours dry. This would make this system the most preferred embodiment for fired strength.

EXAMPLE #5

This test involved looking at another acrylic polymer, as well as some styrene butadiene polymers. The 50/50 blend used in binder #1 was used as the control in this test. Slurries were made up with binder #1, and the following new binder formulas:

Binder #9:

Same as binder #1, except contains 362 grams of Remet 100 latex polymer instead of Remet polymers 120 and 140. Remet 100 is a styrene butadiene type latex.

Binder #10:

Same as binder #1, except contains 362 grams of Remet 101 latex polymer instead of listed polymers. Remet 101 latex is a styrene butadiene type latex.

Binder #11:

Same as binder #1, except contains 362 grams of Remet 121 latex polymer instead of listed polymers. Remet 121 is an acrylic type latex.

Slurries were made from binders #1, #9, #10, and #11, as shown here:

2429 grams binder/4371 grams Remasil® 60 RP325 powder.

The slurries were mixed for 72 hours, then adjusted to 12 seconds, #4 Zahn cup. Room conditions were 45–50% (RH); 72°+/−2° F. (temperature); and 30–240 fpm (air velocity). Wax strips were dipped as before, with Remasil 60 RG30 used as the stucco. The MOR results are shown:

| DRY TIME BETWEEN DIPS | REMASOL® ADBOND® SP-BV (BINDER #1) | BINDER #9 | BINDER #10 | BINDER #11 |
|---|---|---|---|---|
| GREEN MOR | | | | |
| 1 Hour | 539 ± 38 | 557 ± 52 | 450 ± 18 | 465 ± 52 |

MOR (in psi) (all binders at 26% Silica)

| | MOR (in psi) (all binders at 26% Silica) | | | |
|---|---|---|---|---|
| DRY TIME BETWEEN DIPS | REMASOL ® ADBOND ® SP-BV (BINDER #1) | BINDER #9 | BINDER #10 | BINDER #11 |
| 2 Hours | 696 ± 67 | 736 ± 56 | 569 ± 42 | 633 ± 45 |
| 3 Hours | 726 ± 33 | 738 ± 49 | 533 ± 43 | 559 ± 23 |
| FIRED MOR 1800° F. 1 HOUR | | | | |
| 1 Hour | 900 ± 76 | 853 ± 11 | 924 ± 36 | 894 ± 39 |
| 2 Hours | 1192 ± 108 | 1181 ± 127 | 1168 ± 38 | 1181 ± 56 |
| 3 Hours | 1198 ± 87 | 1336 ± 18 | 1255 ± 185 | 1097 ± 96 |

As far as green MOR results, this test indicates that a careful selection of latex polymers can produce other candidates with rapid green MOR progression similar to ADBOND® BV. One aspect of the Binder #9 system is that it has higher fired MOR than all the other systems tested at the longest dry time. This would make for a shell system that is somewhat more difficult to remove. In this particular case, the latex in Binder #9 is a styrene butadiene latex, as is Binder #10. Binder #11 is an acrylic latex. All these binders would yield improved green strength versus standard colloidal silica, especially at the shorter dry times. However, as would be expected, some systems perform better than others.

In the different classifications of latex polymers, selection of a latex is critical. Those latexes that will yield the desired properties when in combination with a colloidal sol must be carefully screened and developed. The latex candidates shown in Example #5 had passed through screening that had rejected many other candidates, and yet only one latex had properties similar to the compositions in accordance with the invention.

It should be obvious from the experimental results presented herein that a blend of a styrene butadiene and acrylic polymers, if carefully selected and screened, could have similar properties to the formulations presented here. A blend of these types of polymers would therefore be within the scope of this invention.

EXAMPLE #6

The development of green strength versus time by testing MOR every hour is a good test to see how the setting (or bonding) of the binder occurs, but a different test was necessary to more readily observe the setting rate. Experiments were performed that looked at the weight loss of the water portion of the slurry versus time on the same MOR bar samples as described previously. While some differences were seen (the enhanced systems with latex lost water slightly faster), the results were not seen as being significant enough to explain the differences noted.

A test that employed only the binder was run. The test consists of placing a measured quantity of binder into a small weigh pan, having a constant air flow across the pan to accelerate water loss by evaporation, and observing the time necessary to set the binder. This test, though somewhat subjective, was able to show differences between the systems tested.

The test procedure was as follows: 2.00 grams of each binder sample was placed into small (1½" diameter with ¾" high sides) aluminum weigh pans. A small fan was placed approximately 3 feet away from the samples. The fan was angled so as to blow over the samples, and the air velocity was checked to insure it was even for all samples. Air velocity over the samples was measured at 300–350 fpm. The samples were observed every 15 minutes until one of the samples started to show signs of gelling. When this occurred, all the samples were monitored continuously to determine the order in which they set.

Samples of binders #1, #9, #10, and #11 were used in this test. Instead of using binder #3 (26% $SiO_2$, no latex) as the control, straight Remasol® SP-30 binder (30% $SiO_2$) was used. This was believed to be a better test, as the higher silica level would set faster, thus showing if the latex addition was truly the mechanism for a faster setting system. The test results are as follows:

| | DRY DOWN TEST | | | | |
|---|---|---|---|---|---|
| ELAPSED TIME | BINDER #1 | BINDER #9 | BINDER #10 | BINDER #11 | STRAIGHT REMASOL ® SP-30 |
| 15 minutes | No Change | No Change | No Change | No Change | No Change |
| 30 minutes | No Change | No Change | No Change | No Change | No Change |
| 45 minutes | | | ←Sample smaller in pan→ | | |
| 60 minutes | | ←Minor drying→ on exposed edges of sample | | ←No Change→ | |
| 75 minutes | | ←Major drying→ on edges, sample getting thick | | ←Drying on exposed edges → | |
| 90 minutes | Sample very | Sample thick, | ←Sample→ starting to thicken. | | ←Minor→ drying on |

-continued

DRY DOWN TEST

| ELAPSED TIME | BINDER #1 | BINDER #9 | BINDER #10 | BINDER #11 | STRAIGHT REMASOL® SP-30 |
|---|---|---|---|---|---|
| | thick, dried (or set) areas extending well past edges. | major drying (or setting) occurring past edges. | More drying on edges. | | exposed edges. |
| 100 minutes | Sample gelled (set up). | Sample very thick. | ←Sample thick→ | | ←Sample→ starting to thicken. |
| 105 minutes | — | Sample very thick. | ←Sample thick→ | | ←Sample→ thick. |
| 110 minutes | — | Sample very thick. | ←Sample thick→ | | ←Sample→ thick. |
| 115 minutes | | Sample gelled (set up). | ←Sample→ very thick. | | ←Sample→ getting very thick. |
| 120 minutes | — | — | ←Sample→ very thick. | | ←Sample→ very thick. |
| 123 minutes | — | — | Sample gelled (set up). | Sample very thick. | ←Sample→ very thick. |
| 127 minutes | — | — | — | Sample gelled (set up). | ←Sample→ very thick. |
| 132 minutes | — | — | — | — | Sample gelled (set up). |

Random weight checks taken on all the samples during the test revealed that there were only minor differences in weight loss between any of the latex modified samples (i.e., the samples lost water weight at almost identical rates). However, the straight SP-30 sample did lose weight somewhat more slowly than the other systems. The faster setting of the binder system in accordance with the invention indicates that the critical concentration point or gelation point of the base colloidal silica binder is reached more quickly when the latex polymer (or polymers) is added, and part of the mechanism may be because the water in the binder is given up more readily (although applicant does not wish to be bound by any particular theory). This reinforces the results seen with the weight checks done on the MOR samples (first paragraph of Example 6).

The above test was repeated, with similar results, although the times were slightly different. In another, somewhat larger test (7 latex polymer binder systems with Remasol® SP-30 at 26% SiO$_2$ and Remasol® SP-30 at 30% concentration), binders #1 and #9 gelled in the shortest time and in virtually the same time. The other systems varied in their respective times to gelation, and it was interesting to note that the sample of straight Remasol® SP-30 actually gelled before one of the latex samples.

Because the binder system in accordance with the invention is quite compatible not only with the commonly used backup refractory materials, but also with those mostly used in primary slurries (i.e., zircon), its use in primary slurry applications is considered to be within the scope of this invention. The inventive binder would yield the same fast processing capability on the primary coat (or coats) as it would on backups. A slurry system using the binder described herein (6% latex polymer loading, 28% silica, zircon flour, −325 mesh, wetting agent and antifoam) was made in the lab and proved to be stable over 6 weeks time. Several wax pieces were dipped into the slurry, and the coating appeared very good, before and after firing.

Although the preferred embodiments of the invention are described in conjunction with the use of silica sols, various other types of sols may be used, as long as the combination with the latex polymer(s) is compatible. Examples of other suitable sols are zirconia sols, alumia sols, and yttria sols.

While the invention has been described in terms of various preferred embodiments, those skilled in the art will recognize that various changes and modifications can be made without departing from the spirit and scope of the invention, as defined in the appended claims.

What is claimed:

1. A water based binder for an investment casting slurry, comprising: a mixture of a colloidal silica sol and at least one latex polymer, wherein the latex polymer combines with the colloidal silica sol so as to reduce a processing time between dips in investment casting as compared with a processing time for a binder free of said latex polymer,
   wherein the colloidal silica sol has a pH in the range of 8 to 11, and,
   wherein the latex polymer is a styrene butadiene latex polymer.

2. A water based binder for an investment casting slurry, comprising: a mixture of a colloidal silica sol and at least two latex polymers, wherein the latex polymers combine with the colloidal silica sol so as to reduce a processing time for a binder free of said latex polymers,
   wherein the colloidal silica sol has a pH in the range of 8 to 11 and
   wherein the latex polymers are a blend of an acrylic latex polymer and a styrene butadiene latex polymer.

3. A water based binder for an investment casting slurry, comprising: a mixture of a colloidal silica sol and at least one styrene butadiene latex polymer, wherein the styrene butadiene latex polymer or polymers lower a gelation point of the colloidal silica sol such that a processing time between dips in investment casting is reduced as compared with a processing time for a binder free of said styrene butadiene latex polymer, wherein the colloidal silica sol has a pH in the range of 8–11.

4. The binder according to claim 3, wherein a weight ratio of the colloidal silica sol to the styrene butadiene latex polymer or polymers is greater than 1 to 1.

5. The binder according to claim 4, wherein the ratio is greater than 4 to 1.

6. The binder according to claim 3, further comprising at least one refractory powder selected from the group consisting of: alumino-silicates, fused silica, quartz silica, alumina, zircon, and zirconia.

* * * * *